(12) United States Patent
Knowles

(10) Patent No.: US 9,285,261 B2
(45) Date of Patent: Mar. 15, 2016

(54) ACOUSTIC FLEXURAL ORDER LEVEL SENSOR

(71) Applicant: STREET SMART SENSORS LLC, Austin, TX (US)

(72) Inventor: Terence J. Knowles, Lake Barrington, IL (US)

(73) Assignee: Street Smart Sensors LLC, Austin, TX (US)

( * ) Notice: Subject to any disclaimer, the term of this patent is extended or adjusted under 35 U.S.C. 154(b) by 257 days.

(21) Appl. No.: 14/025,265

(22) Filed: Sep. 12, 2013

(65) Prior Publication Data

US 2014/0069186 A1   Mar. 13, 2014

Related U.S. Application Data

(60) Provisional application No. 61/700,123, filed on Sep. 12, 2012.

(51) Int. Cl.
*G01F 23/296* (2006.01)

(52) U.S. Cl.
CPC ........ *G01F 23/2966* (2013.01); *G01F 23/2965* (2013.01)

(58) Field of Classification Search
None
See application file for complete search history.

(56) References Cited

U.S. PATENT DOCUMENTS

| 4,316,183 | A | * | 2/1982 | Palmer et al. ................. 340/621 |
| 4,383,443 | A | * | 5/1983 | Langdon ..................... 73/290 V |
| 4,890,490 | A | | 1/1990 | Telford |
| 4,893,496 | A | | 1/1990 | Bau et al. |
| 5,072,427 | A | | 12/1991 | Knowles |
| 5,456,114 | A | * | 10/1995 | Liu et al. ......................... 73/597 |
| 6,581,459 | B1 | | 6/2003 | Lichtenfels |
| 8,919,193 | B2 | * | 12/2014 | Knowles .................... 73/290 V |
| 2004/0149030 | A1 | | 8/2004 | Helig |
| 2006/0090563 | A1 | | 5/2006 | Austerlitz et al. |
| 2007/0169549 | A1 | * | 7/2007 | Kwun et al. ................ 73/290 V |
| 2009/0056451 | A1 | | 3/2009 | Haynes et al. |
| 2009/0126481 | A1 | | 5/2009 | Burris |
| 2009/0236938 | A1 | | 9/2009 | Bromfield |
| 2009/0279581 | A1 | | 11/2009 | Yakymyshyn et al. |

FOREIGN PATENT DOCUMENTS

| WO | 2005103873 A2 | 11/2005 |
| WO | 2006134358 A1 | 12/2006 |
| WO | 2007089412 A2 | 8/2007 |
| WO | 2012067748 A2 | 5/2012 |

OTHER PUBLICATIONS

Lynnworth, Ultrasonic Flowmeters, Physical Acoustics, Academic Press, 1979, pp. 460-463.
Graff, Wave Propagation in Plates and Rods, Wave Motion in Elastic Solids, Dover Publications, 1991, Ch. 8.
International Search Report for PCT/US2013/059474 dated Dec. 19, 2013.

* cited by examiner

*Primary Examiner* — Andre Allen
(74) *Attorney, Agent, or Firm* — Levenfeld Pearlstein, LLC

(57) ABSTRACT

A liquid level sensor includes a rod having a first portion and a second portion, and a wave generation unit affixed to one end of the rod. The wave generation unit generates a wave group that propagates in at least a shear order and a flexural order, and the frequency of the shear wave is based on the diameter of the rod.

24 Claims, 4 Drawing Sheets

ACOUSTIC FLEXURAL ORDER LEVEL SENSOR

BACKGROUND

The present invention relates generally to a liquid level sensor that senses the level of a fluid using a flexural vibration wave group or packet.

One method of detecting the level of a fluid involves the generation of an extensional order waves with an out of plane component that is propagated down the length of a rod. The out of plane component of the wave creates a motion that causes compressional waves in a fluid as the wave propagates down a rod immersed in the fluid. When the wave group contacts the end of the rod, it is reflected backwards towards a transducer. The transducer then analyzes the wave reflected by the end of the rod to determine if the rod is in a fluid. However, these sensors operate poorly in aerated fluids due the interaction of the fluid pressure waves and the bubbles produced in the aerated fluid. To minimize bubbles, many sensors of this type incorporate a baffle around the sensor to prevent bubbles in the fluid from interfering with the operation of the sensor. However, these baffles complicate the installation of the sensor, and also increase the installation costs of the device.

Accordingly, a need exists for a level sensing device that can directly detect the level of an aerated fluid without the use of a baffle or external device.

SUMMARY

One example of a liquid level sensor consistent with the present invention includes a liquid level sensor including a rod having a first portion and a second portion, and a wave generation unit affixed to one end of the rod, where the wave generation unit generates a flexural wave that propagates in at least an order with substantially longitudinal shear at a surface of the rod.

Another example includes a method of detecting the level of an aerated fluid including the steps of generating a flexural wave that propagates down a rod in at least a first order and a higher orders, the higher orders having substantially longitudinal shear displacements at the surface of the rod, by a wave generation unit, trapping the higher orders in a first portion of the rod, analyzing a pulse train generated by the trapped wave order.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION

Figure 1A:
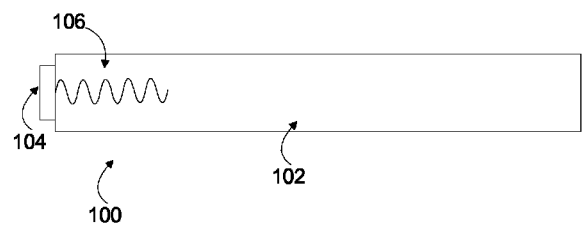
FIG. 1A depicts a rod shaped liquid level sensing sensor that is consistent with the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

FIG. 1A depicts a liquid level sensing rod 100 that is consistent with the present invention. The sensor 100 includes a solid rod 102 and a wave generation unit 104. The wave generation unit 104 is configured to produce a wave 106 that propagates down the length of the rod 102 in a flexural order and a spurious shear order. The wave generating unit 104 may be a piezoelectric transducer. The diameter of the rod 102 is set to a predetermined value that is based on the frequency of the wave 106, and the rod 102 material. The rod 102 material may include aluminum, stainless steel, polyphenylene sulfide (PPS), or any other material capable of propagating an acoustic wave. The diameter of the rod 102 may be set to a value below approximately 0.3125 inches. The diameter of the rod 102 may also be set to a value below approximately 0.15 inches.

The wave generation unit 104 is positioned on a first end of the rod 102 such that the wave generation unit 104 produces a wave 106 having a flexural order and a shear order that propagates towards a second end of the rod 102. The shear order of the wave 106 dissipates quickly after the generation of the wave due to the nature of shear wave propagation down rod shaped devices.

The flexural order of the wave 106, referred to as the flexural wave 106 hereinafter, continues propagating down the rod 102 in at least a first order $F(1,1)$, a second order $F(1,2)$, and a third order $F(1,3)$. The third order $F(1,3)$ may be an order that includes a substantially longitudinal shear at a surface of the rod. The first order $F(1,1)$, second order $F(1,2)$, and third order $F(1,3)$ of the flexural wave 106 propagate at a frequency that is based on the diameter of the rod 102. The diameter of the rod 102 is set such that a specific order of the flexural wave 106 travels the length of the rod 102 and is reflected back towards the wave generating unit 102. The order may be selected from solutions of the Raleigh Lamb equation.

Each order of the flexural wave 106 has a specific "cut-off" frequency where the wave dissipates. The "cut-off" of an order is determined by the product of the frequency and the diameter of the rod 102 (frequency times diameter). The equations to determine this product are given in Karl F. Graff, *Wave Propagation in Plates and Rods*, Ch. 8, Dover Publications (1991). Below this product which is fixed for each rod's material, a mode of this order will not propagate. Accordingly, by adjusting the diameter of the rod, specific orders of the flexural wave 106 may be isolated, or trapped. The frequency to trap a higher order of the flexural wave 106 may be between approximately 850 KHz and approximately 1023 KHz for an approximately 0.25 inch diameter rod. The wave generation unit 104 may be positioned on the end of the rod such that the center of the wave generation unit 104 is aligned with a centerline of the rod 102. The order may be selected based on a desired cut off frequency.

Figure 1B:
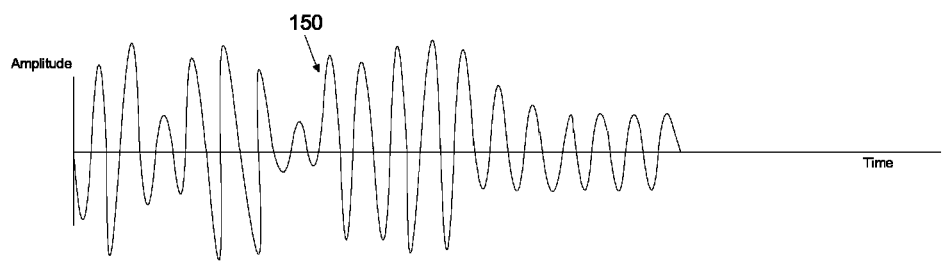
FIG. 1B depicts a pulse train generated by a wave propagating down the rod of FIG. 1A before the sensor is immersed in an aerated fluid.

FIG. 1B depicts a pulse train 150 generated by the flexural wave 106 operating in a third order $F(1,3)$ before the sensor is immersed in an aerated fluid. The wave 106 propagates down the length of the rod 100 in multiple orders until the wave 106 reaches the end of the rod 100. When the wave 106 reaches the end of the rod 100, the wave 106 is reflected back towards the generation unit 104. The wave 106 continues propagating between both ends of the rod 100 until the wave 106 is fully dissipated.

Figure 1C:
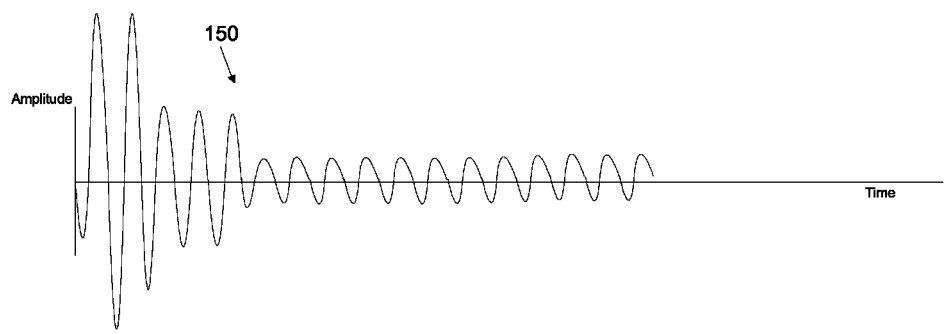
FIG. 1C depicts the pulse train of FIG. 1B when the rod of FIG. 1A is immersed in an aerated fluid.

FIG. 1C depicts the pulse train 150 of the third order $F(1,3)$ of the flexural wave 106 when the rod 100 is immersed in an aerated fluid. When the rod 100 is immersed in an aerated fluid, the amplitude of the pulse train 150 generated by the third order $F(1,3)$ of the flexural wave 106 is reduced across the portion of the rod 100 immersed in the aerated fluid due to immersion dampening. The first order $F(1,1)$ and second order $F(1,2)$ of the flexural wave 106 do not dampen in aerated fluids, so the analysis of the first order $F(1,1)$ and second order $F(1,2)$ pulse trains are not analyzed in aerated fluids. However, the pulse train of the first order $F(1,1)$ and second order $F(1,2)$ of the flexural wave is analyzed if the rod 102 is immersed in an non-aerated fluid. Accordingly, an analysis of the pulse train 150 generated by the wave 106 can indicate whether the rod 100 is immersed in an aerated or non-aerated fluid based on the order of the flexural wave showing a decrease in amplitude.

As an illustrative example, the wave generation unit 104 may analyze multiple orders of the flexural wave to determine the order having a decrease in amplitude. Based on the order, or orders, showing a decrease in amplitude, the wave generation unit 104 may determine if the rod 102 is immersed in an aerated or non-aerated fluid. As one having ordinary skill in the art would appreciate, by analyzing multiple orders of the flexural wave 106, the rod 102 may be used in different monitoring applications. The analysis of the wave forms may be assisted by varying the transducer excitation frequency such that only higher orders are selected.

Figure 2A:
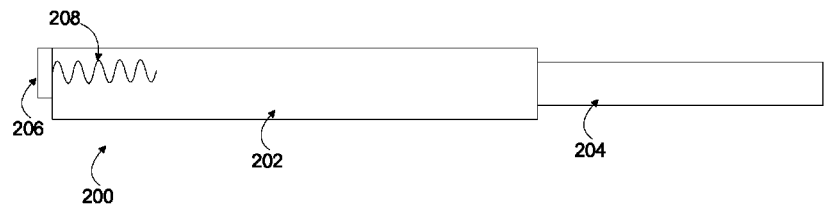
FIG. 2A depicts another embodiment of a liquid level sensing rod.

FIG. 2A depicts another embodiment of a liquid level sensing rod 200. The liquid level sensing rod 200 includes an upper portion 202 having a first diameter, a lower portion 204 having a second diameter, and a wave generation unit 206 positioned on the end of the first portion 202 furthest from the second portion 204. The wave generation unit 206 is configured to generate a flexural wave 208 that propagates down the surface of the rod 200 at a predefined frequency and different orders. The purpose of which is to isolate the most sensitive order, which enhances the overall sensitivity of the device. The wave generation unit 206 may be a piezoelectric shear wave transducer configured to generate a flexural wave that propagates in at least the first order $F(1,1)$, second order $F(1,2)$, and third order $F(1,3)$. The predefined frequency may be a frequency between approximately 850 KHz and approximately 1023 KHz when the upper portion 202 of the level sensor 200 has a diameter of approximately 0.25 inches. The rod 200 may be made from any material capable of propagating an acoustic wave including, but not limited to, aluminum, steel, polyphenylene sulfide (PPS), or any other material capable of propagating an acoustic wave.

The rod 200 is configured to prevent a third order of the flexural wave 208 $F(1,3)$ from propagating from the first section 202 to the second section 204. Further, the first portion 202 of the rod 200 is configured to reflect the third order $F(1,3)$ of the flexural wave 208 propagating towards the second portion 204 back towards the wave generation unit 206. Because the diameter of the second portion 204 of the rod 200 has a diameter smaller than that of the first portion 202 of the rod 200, the third order $F(1,3)$ of the wave 208 is prevented from propagating into the second portion 204. To ensure the third order $F(1,3)$ wave does not pass into the second portion 204, the diameter of the second portion is set to a value below the "cut-off" frequency of the third order $F(1,3)$. Accordingly, because the third order $F(1,3)$ of the flexural wave 208 cannot propagate into the second portion 204, it is reflected from the edge of the second portion 204 back towards the wave generation unit 206 effectively trapping the third order $F(1,3)$ of the flexural wave 208 in the first portion 202. The value of the second diameter is set to a value greater than the "cut off" frequencies of the first order $F(1,1)$ and the second order $F(1,2)$ of the flexural wave 208 to allow the first order $F(1,1)$ and second order $F(1,2)$ to propagate into the second portion. The diameter of the second portion 204 may be selected such that the diameter frequency product produces a desired cut off frequency.

Figure 2B:
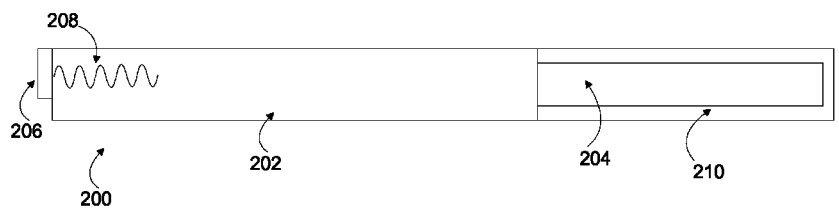
FIG. 2B depicts the liquid level sensing rod of FIG. 2A including an absorbing cap positioned around the outer surface of a second portion of the rod.

FIG. 2B depicts the liquid level sensing rod 200 of FIG. 2A including an absorbing cap 210 positioned around the outer surface of the second portion 204. The absorbing cap 210 may be made of any material capable of absorbing the first and second order flexural modes. By allowing the first order $F(1,1)$ and second order $F(1,2)$ of the flexural wave 208 to propagate into the second portion 204, the accuracy of the rod 200 is increased because interference from the first order $F(1,1)$ and the second order $F(1,2)$ of the flexural wave 208 is prevented from reflecting back from the second portion 204 into the first portion 202.

Figure 2C:
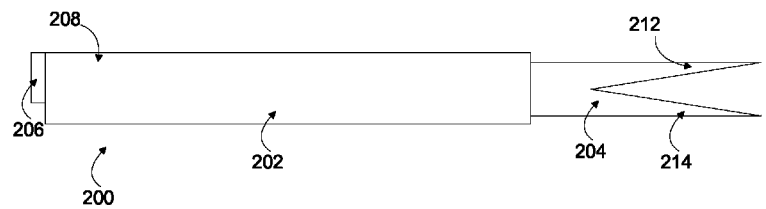
FIG. 2C depicts a side view of a liquid level sensing rod.

FIG. 2C depicts a side view of the liquid level sensing rod 200 of FIG. 2A where the second portion 204 is configured to prevent propagation of the third order $F(1,3)$ of the flexural wave 208 from the first portion 202 to the second portion 204. The second portion 204 is notched such that an upper extension 212 and a lower extension 214 are formed across a portion of the second portion 204. The notch acts to dissipate the third order $F(1,3)$ of the flexural wave 208 as the third order $F(1,3)$ propagates down into the second portion 204. Accordingly, the third order $F(1,3)$ of the flexural wave 208 is reflected by the edges of the first portion 202, thereby trapping the third order $F(1,3)$ in the first portion 202.

Figure 2D:
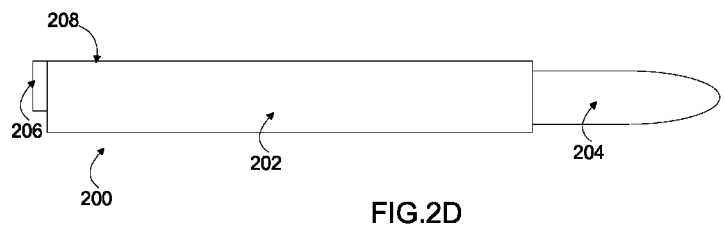
FIG. 2D depicts a top view of the liquid level sensing rod of FIG. 2C.

FIG. 2D depicts a top view of the liquid level sensing rod 200 of FIG. 2C. The ends of the upper extension 212 and lower extension 214 are curved to further enhance the dissipation of the third order $F(1,3)$ of the flexural wave 208. Accordingly, by forming the upper extension 212 and lower extension 214 in the second portion 204, and curving the ends of the extensions 212 and 214, the third order $F(1,3)$ is prevented from propagating into the extensions, thereby trapping the third order $F(1,3)$ in the first portion 202 of the rod.

Figure 3A:
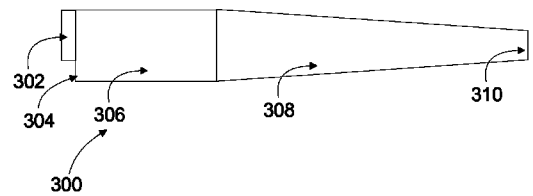
FIG. 3A depicts another embodiment of a liquid level sensing rod.

FIG. 3A depicts another embodiment of a liquid level sensing rod 300. The rod 300 includes a wave generation unit 302 secured to a first end 304, a first portion 306, and a second portion 308. The upper and lower surfaces of the second portion 308 angle towards a second end 310 of the rod 300. The rod 302 material may include aluminum, stainless steel, polyphenylene sulfide (PPS), or any other material capable of propagating an acoustic wave. The diameter of the rod may be set to a value below approximately 0.3125 inches. The diameter of the rod may also be set to a value below approximately 0.15 inches.

The wave generation unit 302 is configured to generate a wave, operating in a shear order and a flexural order, that propagates down the length of the rod 300 in at least a first order $F(1,1)$, a second order $F(1,2)$, and a third order $F(1,3)$. Due to the configuration of the rod 300, the shear order of the wave dissipates quickly, and the first order $F(1,1)$ and the second order $F(1,2)$ of the flexural wave propagate into the second portion 308 of the rod 300, while the third order $F(1,3)$ is reflected back towards the wave generation unit 302 when the wave engages an edge of the second portion 308.

Figure 3B:
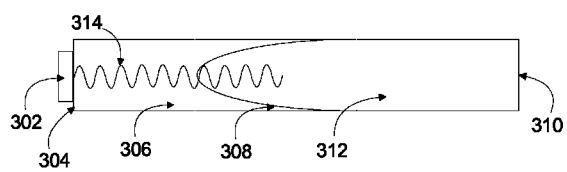
FIG. 3B depicts a top view of the rod of FIG. 3A.

FIG. 3B depicts a top view of the rod 300 of FIG. 3A. The second portion 308 includes a sloped surface 312. The sloped surface 312 is defined, for example by shaping or forming, in the upper surface and lower surface of the second portion 308, such that the sloped surface 312 slopes from the first portion towards the second end 310. The second end 310 has a predefined thickness that is greater than approximately zero. The end of the sloped potion 312 closest to the wave generation unit 302 has a substantially elliptical shape.

The wave generation unit 302 is configured to generate a wave 314 that propagates down the length of the rod 300. The wave 308 operates in a shear order and a flexural order, with the shear order dissipating quickly and the flexural order propagating in the first order $F(1,1)$, second order $F(1,2)$, and third order $F(1,3)$ in the first portion 306 of the rod 300. Due to the reduction of diameter in a second portion 308 of the rod 300, only the first order $F(1,1)$ and second order $F(1,2)$ propagate into the second portion 308. The third order $F(1,3)$ is reflected by the ends of the second portion 308, thereby trapping the third order $F(1,3)$ in the first portion 306. The second portion 308 may also be shaped such that the first order $F(1,1)$ and second order $F(1,2)$ propagate into the second portion 308 with only the third order $F(1,3)$ being trapped in the first portion 306.

Figure 4:
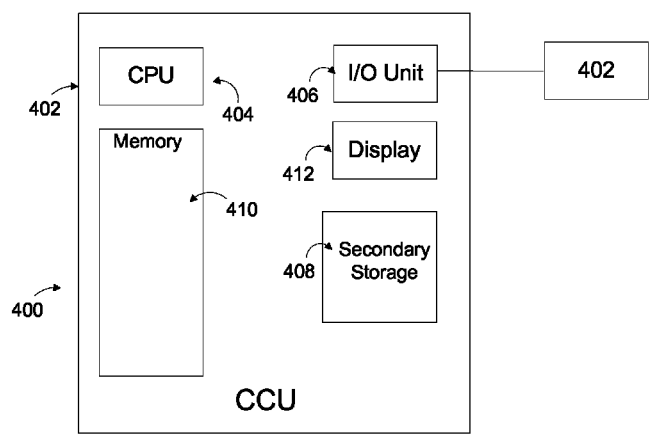
FIG. 4 depicts one embodiment of a control panel used to control and monitor a liquid level sensing rod.

FIG. 4 depicts one embodiment of a control panel 400 used to control and monitor a liquid level sensing rod 100, 200, or 300. The control panel 400 includes a central control unit 402 that is electrically coupled to a wave generation unit 104, 206, or 302. The central control unit 402 (CCU) includes a central processing unit (CPU) 404, an input output (I/O) unit 406, a secondary storage device 408, and a memory 410. The central control unit 402 may also include a digital display 412. Central control unit 402 may further comprise standard input devices such as a keyboard, a mouse, a digitizer, or a speech processing means (each not illustrated). The I/O unit 406 may further include a plurality of analog outputs that provides a variable voltage or current to the wave generation unit 104, 206, or 302. The I/O unit 406 also includes a plurality of inputs that are electrically coupled to sensors, and which monitor the pulse train and other environmental conditions.

The control panel 400 transmits a signal to the wave generation unit 104, 206, or 302 to generate different waveforms based on a desired measurement. To determine a level of a fluid in which the sensor 100, 200, or 300 is immersed, the control panel 400 transmits a signal, via the I/O unit 406, to the wave generation unit 104, 206, or 302 to produce a shear wave burst. A pulse train sensor 402 coupled to the I/O unit 406 of the control panel 400 captures and stores the reflected pulse train in the memory 410. Software operating in the CPU 404 analyzes the returning pulse train to determine if a reduction in amplitude occurs across the length of the rod 100, 200, or 300.

Figure 5:
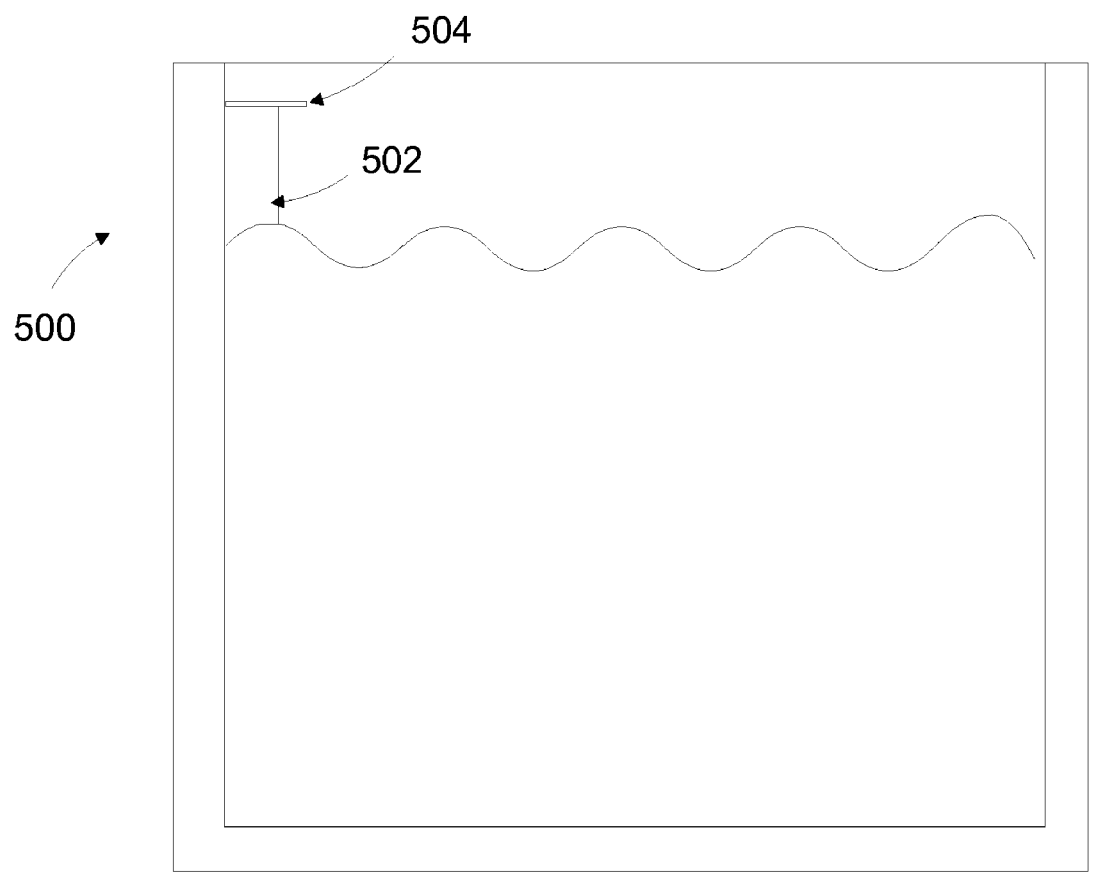
FIG. 5 depicts a tank that includes a liquid level sensing rod.

FIG. 5 depicts a tank 500 that includes a liquid level sensing rod 502. The liquid level sensing rod 502 may be any of the configurations previously disclosed. One end of the rod 502 is affixed to a mounting unit 504 that is secured to the side of the tank 500 such that the rod 502 extends outward from the mounting unit 504. As the liquid 504 contacts the rod 502, the pulse train of a wave generated by the wave generation unit 506 on the portion of the rod immersed in the liquid is reduced. Since the third order of the flexural wave does not dampen in aerated fluids, a discrete level indication can be detected in the tank 500. The tank 500 may also include a plurality of sensors 502 positioned at different elevations in tank 500 to detect liquid at different levels within the tank 500.

Essentially, it has been found that a particular mode order functions well in aerated fluids. It is believed that the particular functioning order generates a shearing action close to the rod surface in a longitudinal, as opposed to a transverse direction. Moreover, it has been found that a shear transducer will excite flexural motion, as well as shear, and because shear doesn't propagate to any great extent in a rod, the flexural motion remains as the analyzing wave motion. Because flexural orders have cut-off frequencies, this can be exploited to isolate the desired motion by trapping in a region closest to the transducer, thus increasing sensitivity by eliminating orders that do not respond to aerated fluids.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A liquid level sensor including:
a rod having a first portion and a second portion; and
a wave generation unit affixed to one end of the rod,
wherein the wave generation unit generates a flexural wave that propagates in at least an order with longitudinal shear at a surface of the rod.

2. The sensor of claim 1 wherein the flexural mode wave order is the third order.

3. The sensor of claim 1 wherein the flexural mode wave order is the fourth order.

4. The sensor of claim 1 wherein the flexural mode wave order is any order having a substantially longitudinal shear at the surface of the rod.

5. The sensor of claim 1 wherein an operating frequency of the flexural wave is based on a diameter of the rod.

6. The sensor of claim 1 wherein the flexural mode wave order is set to an order having the highest cut off frequency.

7. The sensor of claim 1 wherein the order is selected based on the Rayleigh Lamb equation.

8. The sensor of claim 1 where in the rod includes a first portion and a second portion.

9. The sensor of claim 8 wherein the second portion of the rod includes a cap unit.

10. The sensor of claim 8 wherein a diameter of the rod in the first portion is greater than the diameter of the rod in the second portion.

11. The sensor of claim 8 wherein the diameter frequency product of the second section is selected such that the diameter frequency product is below a cut off value of at least one higher order.

12. The sensor of claim 8 wherein the second portion is tapered from an end intersecting the first portion and the second portion towards an open end of the second portion.

13. The sensor of claim 1 wherein the rod is made of aluminum, steel, or PPS.

14. The sensor of claim 1 wherein the wave generation unit generates different mode waves to determine if the rod is immersed in an aerated or a non-aerated fluid.

15. A method of detecting the level of an aerated fluid including the steps of:
- generating a flexural wave that propagates down a rod in at least a first order, a second order, and a third order by a wave generation unit;
- trapping at least the third order of the wave in a first portion of the rod;
- analyzing a pulse train generated by the trapped wave order.

16. The method of claim 15 wherein a diameter of the rod is less than approximately 0.3125 inches.

17. The method of claim 15 wherein the wave propagates at a frequency of between approximately 850 MHz and approximately 1023 MHz.

18. The method of claim 15 wherein a diameter of the rod in the first portion is larger than the diameter of the rod in a second portion.

19. The method of claim 15 including the step of positioning a cap unit on a second portion.

20. The method of claim 18 wherein a surface of the rod angles from the first portion to an end of the second portion on at least two sides of the rod.

21. The method of claim 18 wherein an end of the second portion includes a notch extending along a centerline of the rod from the end of the second portion towards the first portion.

22. The method of claim 21 wherein the end of the second portion is substantially curved in a top view.

23. The method of claim 15 wherein the rod includes aluminum or stainless steel.

24. The method of claim 15 wherein the rod includes polyphenylene sulfide.

* * * * *